(12) United States Patent
Panda et al.

(10) Patent No.: US 8,488,519 B2
(45) Date of Patent: Jul. 16, 2013

(54) LOAD-BALANCED NSAPI ALLOCATION FOR IWLAN

(75) Inventors: Biswaranjan Panda, Santa Clara, CA (US); Kevin Shatzkamer, San Francisco, CA (US); Mark Grayson, Maidenhead (GB); Richard Kyle Forster, San Francisco, CA (US)

(73) Assignee: Cisco Technology, Inc., San Jose, CA (US)

( * ) Notice: Subject to any disclaimer, the term of this patent is extended or adjusted under 35 U.S.C. 154(b) by 1220 days.

(21) Appl. No.: 11/767,419

(22) Filed: Jun. 22, 2007

(65) Prior Publication Data

US 2008/0317053 A1    Dec. 25, 2008

(51) Int. Cl.
*H04W 4/00* (2009.01)
*H04L 12/28* (2006.01)
*H04L 12/56* (2011.01)

(52) U.S. Cl.
USPC ............................ 370/328; 370/338; 370/401

(58) Field of Classification Search
None
See application file for complete search history.

(56) References Cited

U.S. PATENT DOCUMENTS

| | | | | |
|---|---|---|---|---|
| 7,093,002 | B2 * | 8/2006 | Wolff et al. | 709/219 |
| 7,401,146 | B1 * | 7/2008 | Menditto et al. | 709/227 |
| 7,423,962 | B2 * | 9/2008 | Auterinen | 370/216 |
| 2002/0049842 | A1 * | 4/2002 | Huetsch et al. | 709/225 |
| 2005/0120350 | A1 * | 6/2005 | Ni et al. | 718/105 |
| 2005/0163069 | A1 * | 7/2005 | Xu et al. | 370/328 |
| 2005/0283829 | A1 * | 12/2005 | Zhurakivsky et al. | 726/4 |
| 2006/0104262 | A1 * | 5/2006 | Kant et al. | 370/352 |
| 2006/0227705 | A1 * | 10/2006 | Chandwadkar et al. | 370/229 |
| 2007/0127444 | A1 * | 6/2007 | Gras et al. | 370/356 |
| 2008/0092224 | A1 * | 4/2008 | Coulas et al. | 726/12 |
| 2008/0104607 | A1 * | 5/2008 | Baker | 718/105 |
| 2008/0107119 | A1 * | 5/2008 | Chen et al. | 370/395.21 |

OTHER PUBLICATIONS

Shin-ming Cheng, Phone Lin, Guan-hua Tu, Li-chen Fu and Ching-feng Liang, An intelligent GGSN dispatching mechanism for UMTS, Computer Communications, vol. 28, 2005, pp. 947-955, Elsevier, Dec. 9, 2004.*

Juergen Carstens, APN-based distribution of PDP contexts in the GGSN, Siemens AG, IP.com Prior Art Database No. IPCOM0001963 D, Oct. 25, 2003, pp. 1-6, Machine Translation from German.*

Author Unknown, Discussion on Architectural Issues for NSAPI Usage on the GN' Interface, Vodaphone, The Third Generation Partnership Project: Technical Specification Group Services and System Aspects, Meeting 24, Seoul, South Korea, Jun. 10, 2004, Document Id SP-040412, pp. 1-2.*

"3rd Generation Partnership Project; Technical Specification Group Services and System Aspects; 3GPP system to Wireless Local Area Network (WLAN) interworking; System description (Release 7)", 3GPP TS 23.234 V7.5.0 (Mar. 2007) Technical Specification, 85 pages, Copyright 2007.

* cited by examiner

*Primary Examiner* — John Blanton
*Assistant Examiner* — Christopher Crutchfield
(74) *Attorney, Agent, or Firm* — Patent Capital Group

(57) ABSTRACT

In one embodiment, a load balancer receives a message from a tunnel termination gateway (TTG) associated with a mobile device. The load balancer may receive messages from a plurality of TTGs. A gateway node in a plurality of gateway nodes in which to send the message is determined. The load balancer then assigns a NSAPI for use by the gateway node. For example, the NSAPI may be associated with a tunnel that is generated between the TTG and GGSN. The load balancer ensures that the assigned NSAPI is not currently in use at the gateway node. Thus, no overlapping of NSAPIs may occur even though the load balancer is processing messages from multiple TTGs for multiple gateway nodes.

18 Claims, 4 Drawing Sheets

LOAD-BALANCED NSAPI ALLOCATION FOR IWLAN

TECHNICAL FIELD

Particular embodiments generally relate to networking.

BACKGROUND

A packet data gateway (PDG) functionality may be performed using a tunnel termination gateway (TTG) and a gateway GPRS support node (GGSN) as specified in 3GPP TS 23.234 appendix F. In this case, the TTG assigns a network service access point identifier (NSAPI), which is used to identify a General Packet Radio Service (GPRS) tunneling protocol (GTP) tunnel between the TTG and GGSN. This is different from previous processes where the mobile device assigned the NSAPI. In the 3GPP TS 23.234 appendix F architecture, a single TTG is associated with a single GGSN.

The problem with using a one-to-one mapping between a TTG and GGSN is that scalability is not provided. For example, when multiple GGSNs are being used, the load at one GGSN may be more than another GGSN, which may cause an overloaded GGSN to end a session even when another GGSN has available resources. However, because of the one-to-one mapping, a TTG cannot send messages to the underutilized GGSN. Rather, the overloaded GGSN still must be used.

To increase scalability, load balancing may be used to spread use of GGSN resources to underutilized GGSNs. However, because the TTG assigns the NSAPI, it is possible that the same NSAPI may be sent to the same GGSN by different TTGs. In this case, a tunnel may already be associated with the NSAPI. Then, a second TTG may assign the same NSAPI to a new tunnel for the same GGSN. In this case, the GGSN will tear down the first tunnel and initiate a new tunnel using the new NSAPI. This may end an active session prematurely.

DESCRIPTION OF EXAMPLE EMBODIMENTS

Overview

In one embodiment, a load balancer receives a message from a tunnel termination gateway (TTG) associated with a mobile device. The load balancer may receive messages from a plurality of TTGs. A gateway node in a plurality of gateway nodes in which to send the message is determined. The load balancer then assigns a NSAPI for use by the gateway node. For example, the NSAPI may be associated with a tunnel that is generated between the TTG and GGSN. The load balancer ensures that the assigned NSAPI is not currently in use at the gateway node. Thus, no overlapping of NSAPIs may occur even though the load balancer is processing messages from multiple TTGs for multiple gateway nodes.

Example Embodiments

Figure 1:
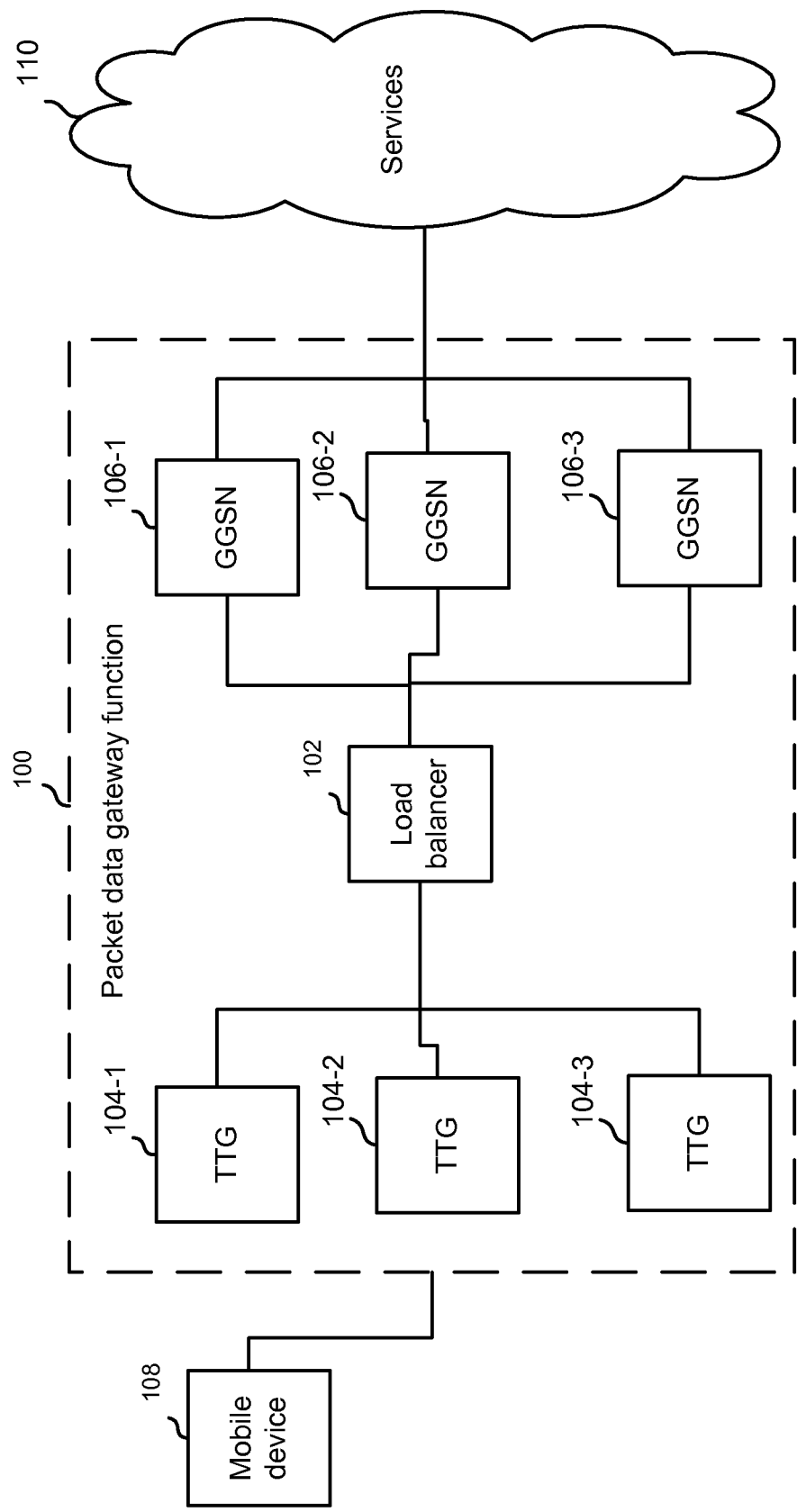
FIG. 1 depicts an example of a system for providing NSAPI allocation.

FIG. 1 depicts an example of a system for providing NSAPI allocation. As shown, the system includes a load balancer 102, a plurality of TTGs 104, a plurality of GGSNs 106, a mobile device 108, and data services 110.

TTG 104 and GGSN 106 provide a packet gateway functionality 100 for the system. The packet data gateway functionality allows mobile device 108 to access data services 110 in a wireless local area network (WLAN), such as a wireless fidelity (WiFi). In WLAN, a packet data gateway may be used. However, legacy carriers may use existing network devices, such as the GGSN to implement the packet data gateway functionality. The packet data gateway functionality is responsible for securing the traffic coming over the WLAN, assigning IP addresses, authenticating users and services, generating accounting information, and applying QoS policies.

Mobile device 108 may be any suitable mobile device. For example, mobile device 108 may include a cellular telephone, laptop computer, personal digital assistant (PDA), personal e-mail device, etc. Mobile device 108 may access TTG 104 through an access network 112. Access network 112 may include a wireless local area network (WLAN), or other mobile communications system. Although a WLAN is described, it will be understood that any suitable wireless network may be used.

TTG 104 is a device that provides a tunnel between mobile device 108 and itself In one embodiment, the tunnel may be an IPSec tunnel. TTG 104 provides termination of the tunnel with mobile device 108.

GGSN 106 is configured to communicate with data services 110. GGSN allows service providers to provide data services to mobile device 108. GGSN 106 provides a gateway to data services 110. A gateway GPRS support node (GGSN) acts as an interface between the GPRS backbone network and the external packet data networks (radio network and the IP network).

In one embodiment, a tunnel, such as a GTP tunnel, is created between TTG 104 and GGSN 106. Although a tunnel is described, it will be understood that any connection may be used between TTG 104 and GGSN 106. GGSN 106 identifies the GTP tunnel using an NSAPI that is assigned. Thus, communications from data services 110 may include the NSAPI and GGSN 106 uses the NSAPI to determine which tunnel the messages should be sent through. Also, TTG 104 may use the NSAPI to send messages to GGSN 106 through the correct tunnel.

Load balancer 102 may receive a packet data protocol (PDP) context create message, which is a message to create a tunnel, from TTG 104. Load balancer 102 then dynamically assigns an NSAPI for the PDP context create message. This message is then sent to GGSN 106, which can then create a tunnel between TTG 104 and GGSN 106. It should be noted that any protocol may be used to create a tunnel and creating a tunnel is known in the art.

As discussed in the background, the TTG conventionally assigned the NSAPI. If multiple TTGs assigned NSAPIs independently, it is possible they may assign the same NSAPI for identifying different tunnels to the same GGSN. This results in the tearing down of an existing tunnel with the same NSAPI. This is undesirable in that the two NSAPIs are probably associated with different mobile devices that have initiated different sessions. Because the same NSAPI has been allocated for the tunnels, only one tunnel can be active.

However, particular embodiments allow load balancer 102 to determine NSAPIs for tunnels. Load balancer 102 is a central point for receiving tunnel create requests from TTGs 104 and can assign and keep track of which NSAPIs were assigned to which GGSNs 106. Thus, load balancer 102 can determine which GGSNs 106 have had which NSAPIs assigned. Then, when an NSAPI is determined, load balancer 102 ensures that the NSAPIs do not overlap for a specific GGSN 106.

Figure 2:
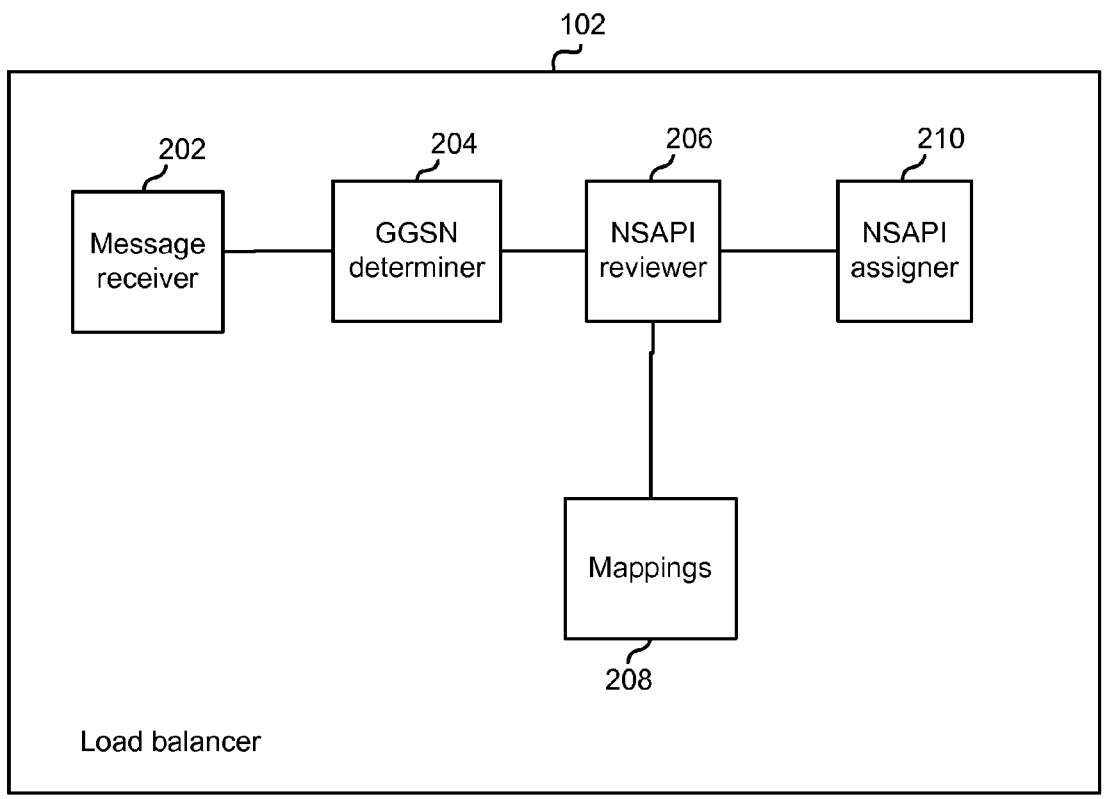
FIG. 2 depicts a more detailed example of a load balancer.

FIG. 2 depicts a more detailed example of load balancer 102. As shown, a message receiver 202, a GGSN determiner 204, an NSAPI reviewer 206, mappings 208, and an NSAPI assigner 210 are provided.

Message receiver 202 is configured to receive a message from TTG 104. For example, the message received may be an access request from mobile device 108. When the message is received, a tunnel may need to be created between TTG 104 and GGSN 114.

The message from TTG 104 may or may not include an assigned NSAPI. For example, TTG 104 may be configured such that an NSAPI is not assigned when an access request is received because load balancer 102 assigns them. However, to conform to prior specifications, TTG 104 may be allowed to assign an NSAPI but this NSAPI may be overwritten by load balancer 102 to ensure no overlapping at GGSNs 114.

GGSN determiner 204 determines a GGSN to send the access request to. For example, any load balancing techniques may be used to determine which GGSN 106 should be assigned the access request. In one example, the GGSN that has available resources is determined to service the access request. Also, network bandwidth, cost, and other factors may be taken into account in determining the GGSN.

NSAPI reviewer 206 is configured to determine NSAPIs that have already been assigned at the determined GGSN 106. For example, mappings 208 are maintained for each GGSN and include an NSAPI to tunnel mapping. A table look-up may be performed to determine which NSAPIs have already been assigned. Also, sequence numbers may be used where NSAPIs below a certain threshold have already been assigned. The NSAPI is then assigned a value that is not active at a specific GGSN 106. This allows NSAPI reviewer 206 to determine which NSAPIs have already been assigned for a specific GGSN 106. The mappings may also identify which mobile device 108 is associated with the NSAPI, which may allow for call continuity to be provided as will be described later.

NSAPI assigner 210 then determines a unique NSAPI for the determined GGSN 106. In one embodiment, NSAPI assigner 210 may generate a new NSAPI for the access request. Also, if an NSAPI was assigned by TTG 104, the NSAPI may be overwritten. However, if the NSAPI assigned by TTG 104 is not in use at the determined GGSN 106, then the NSAPI assigned by TTG 104 may be used.

Figure 3:
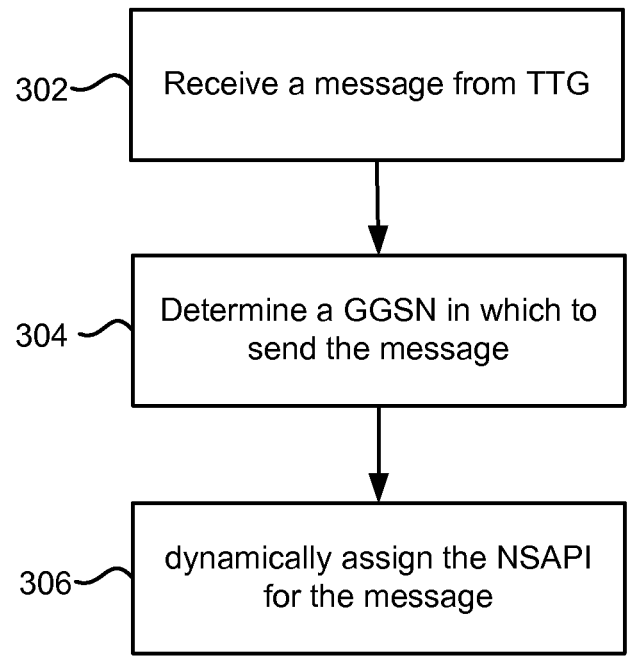
FIG. 3 depicts an example of a method for assigning NSAPIs.

FIG. 3 depicts an example of a method for assigning NSAPIs. Step 302 receives a message from TTG 104. The message may be for creating a tunnel.

Step 304 determines a GGSN 106 in which to send the message. For example, load balancer 102 may determine an appropriate GGSN 106 to handle the request.

Step 306 then dynamically assigns the NSAPI for the message. For example, an NSAPI that is unique to the determined GGSN 106 is assigned.

Figure 4:
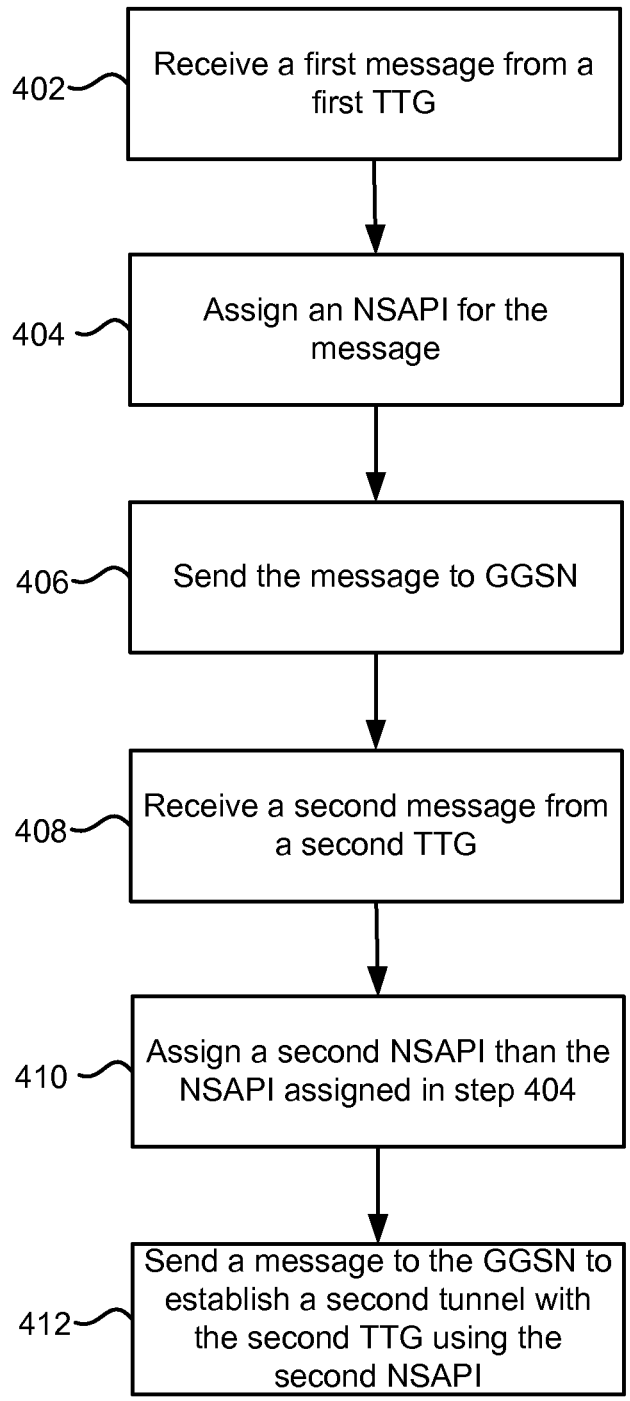
FIG. 4 depicts a more detailed example of a method for assigning NSAPIs.

FIG. 4 depicts a more detailed example of a method for assigning NSAPIs. Because of the existence of multiple TTGs, load balancer 102 may process requests from different TTGs that may go to the same GGSN 106.

Step 402 receives a first message from a first TTG 104. The first message may be for a first mobile device 108-1.

Step 404 assigns an NSAPI for the message. This NSAPI is a value that is unique to a first GGSN 106-1.

Step 406 sends the message to GGSN 106-1. GGSN 106-1 may then establish a tunnel with TTG 104-1.

Step 408 receives a second message from a second TTG 104-2. This message may be for a second mobile device.

Step 410 assigns a second NSAPI than the NSAPI assigned in step 404. This is because the second message is going to be sent to the same GGSN 106-1.

Step 412 then sends a message to GGSN 106-1 and GGSN 106-1 can then establish a second tunnel with TTG 104-2 using the second NSAPI. Accordingly, load balancer 102 assures that the NSAPIs assigned do not overlap.

Particular embodiments may be used to provide call continuity. For example, a mobile device may start a call using a first access network. The call is connected through a first TTG 104-1 and GGSN 106-1. During the call, mobile device 108 may attach to a different access network. For example, mobile device 108 may roam and attach to a WiFi network. The WiFi network may send an access request to a second TTG 104-2. When a second message is received from a second TTG 104-2, load balancer 102 may determine it is for mobile device 108. Load balancer 102 may determine the call is for the mobile device because an identifier, such as an IP address, may be the same. Accordingly, it can determine that it should be sent to the same GGSN 106-1. However, to avoid tearing down the original tunnel, a different NSAPI may be assigned. Then, a tunnel may be brought up between GGSN 106-1 and TTG 104-2. The call may be handed off and then the first tunnel is torn down. The call continues using the tunnel between TTG 104-2 and GGSN 106-1, however. Accordingly, call continuity may be provided using load balancer 102.

Particular embodiments provide many advantages. For example, load balancer 102 allows scalability in using multiple TTGs 104 and GGSNs 106. Accordingly, GGSN resources may be optimally used. Also, load balancer 102 ensures that NSAPIs assigned to tunnels are unique and thus unnecessary tearing down of tunnels because of overlapping NSAPIs does not occur.

Although the description has been described with respect to particular embodiments thereof, these particular embodiments are merely illustrative, and not restrictive. Although an NSAPI is described, it will be understood that the NSAPI may be any identifier that could overlap at the GGSN. For example, the NSAPI may be other tunnel identifiers.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time. The sequence of operations described herein can be interrupted, suspended, or otherwise controlled by another process, such as an operating system, kernel, etc. The routines can operate in an operating system environment or as standalone routines occupying all, or a substantial part, of the system processing. Functions can be performed in hardware, software, or a combination of both. Unless otherwise stated, functions may also be performed manually, in whole or in part.

In the description herein, numerous specific details are provided, such as examples of components and/or methods, to provide a thorough understanding of particular embodiments. One skilled in the relevant art will recognize, however, that a particular embodiment can be practiced without one or more of the specific details, or with other apparatus, systems, assemblies, methods, components, materials, parts, and/or the like. In other instances, well-known structures, materials, or operations are not specifically shown or described in detail to avoid obscuring aspects of particular embodiments.

A "computer-readable medium" for purposes of particular embodiments may be any medium that can contain and store the program for use by or in connection with the instruction execution system, apparatus, system, or device. The computer-readable medium can be, by way of example only but not by limitation, a semiconductor system, apparatus, system, device, or computer memory.

Particular embodiments can be implemented in the form of control logic in software or hardware or a combination of both. The control logic, when executed by one or more processors, may be operable to perform that what is described in particular embodiments.

A "processor" or "process" includes any hardware and/or software system, mechanism or component that processes data, signals, or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems.

Reference throughout this specification to "one embodiment", "an embodiment", "a specific embodiment", or "particular embodiment" means that a particular feature, structure, or characteristic described in connection with the particular embodiment is included in at least one embodiment and not necessarily in all particular embodiments. Thus, respective appearances of the phrases "in a particular embodiment", "in an embodiment", or "in a specific embodiment" in various places throughout this specification are not necessarily referring to the same embodiment. Furthermore, the particular features, structures, or characteristics of any specific embodiment may be combined in any suitable manner with one or more other particular embodiments. It is to be understood that other variations and modifications of the particular embodiments described and illustrated herein are possible in light of the teachings herein and are to be considered as part of the spirit and scope.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", an and "the" includes plural references unless the context clearly dictates otherwise. Also, as used in the description herein and throughout the claims that follow, the meaning of "in" includes "in" and "on" unless the context clearly dictates otherwise.

The foregoing description of illustrated particular embodiments, including what is described in the Abstract, is not intended to be exhaustive or to limit the invention to the precise forms disclosed herein. While specific particular embodiments of, and examples for, the invention are described herein for illustrative purposes only, various equivalent modifications are possible within the spirit and scope, as those skilled in the relevant art will recognize and appreciate. As indicated, these modifications may be made to the present invention in light of the foregoing description of illustrated particular embodiments and are to be included within the spirit and scope.

Thus, while the present invention has been described herein with reference to particular embodiments thereof, a latitude of modification, various changes and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit. It is intended that the invention not be limited to the particular terms used in following claims and/or to the particular embodiment disclosed as the best mode contemplated for carrying out this invention, but that the invention will include any and all particular embodiments and equivalents falling within the scope of the appended claims.

We claim:

1. A method, comprising:

receiving, at a load balancer, a message associated with a mobile device from a first tunnel termination gateway (TTG) of a plurality of TTGs;

determining, by the load balancer, a gateway GPRS support node (GGSN) in a plurality of GGSNs to which to send the message from the load balancer, the first TTG and the determined GGSN providing a packet data gateway function in a wireless local area network, wherein the load balancer is a central point between the plurality of TTGs and the plurality of GGSNs in the packet data gateway function; and assigning, at the load balancer, a network service access point identifier (NSAPI) for use by the determined GGSN, wherein the load balancer ensures that the assigned NSAPI is not currently in use at the determined GGSN by performing a table look-up in the load balancer;

receiving a plurality of messages from the plurality of TTGs;

for messages in the plurality of messages, determining different GGSNs in the plurality of GGSNs to which to send the messages; and for each of the different GGSNs, assigning, at the load balancer, NSAPIs for use by a GGSN to which messages will be sent, wherein the load balancer ensures that the assigned NSAPIs for the GGSN are not currently in use at the GGSN.

2. The method of claim 1, further comprising maintaining a mapping of NSAPIs that are assigned to each of the plurality of GGSNs, wherein the assigning the NSAPI comprises:
determining the NSAPI based on the mapping using the look-up table in the load balancer such that the determined NSAPI does not overlap with any other NSAPIs that are assigned to the determined GGSN.

3. The method of claim 1, wherein the NSAPI is associated with a first tunnel between the first TTG and the determined GGSN.

4. The method of claim 1, wherein the assigning the NSAPI comprises overwriting in the load balancer, an NSAPI that was previously assigned for the determined GGSN by a second TTG.

5. The method of claim 1, wherein the assigning the NSAPI comprises generating the NSAPI for use by the determined GGSN.

6. The method of claim 1, further comprising:
receiving a second message from a second TTG;
determining a second NSAPI for the second message, wherein the second NSAPI does not overlap with the assigned NSAPI; and
assigning, at the load balancer, the second NSAPI for use by the determined GGSN.

7. The method of claim 6, further comprising sending the second NSAPI to the determined GGSN, the determined GGSN establishing a connection with the second TTG, wherein session continuity is provided for the mobile device using the connection with the second TTG.

8. The method of claim 1, further comprising sending the NSAPI to the determined GGSN, the determined GGSN establishing a connection with the first TTG and associating the NSAPI with the connection.

9. An apparatus, comprising:
one or more computer processors; and
logic encoded in one or more tangible storage media for execution by the one or more computer processors, and when executed operable to:
receive, at the apparatus, a message associated with a mobile device from a first tunnel termination gateway (TTG) of a plurality of TTGs;
determine, at the apparatus, a gateway GPRS support node (GGSN) in a plurality of GGSNs to which to send the message from the apparatus, the first TTG and the determined GGSN providing a packet data gateway function in a wireless local area network, wherein the apparatus is a central point between the plurality of TTGs and the plurality of GGSNs in the packet data gateway function; and
assign, at the apparatus, a network service access point identifier (NSAPI) for use by the determined GGSN, wherein the apparatus ensures that the assigned NSAPI is not currently in use at the determined GGSN by performing a table look-up in the apparatus;
receive a plurality of messages from the plurality of tunnel termination gateways TTGs;
for messages in the plurality of messages, determine different GGSNs in the plurality of GGSNs to which to send the messages; and
for each of the different gateways, assign, at the apparatus, NSAPIs for use by a GGSN that messages will be sent, wherein the apparatus ensures that the assigned NSAPIs for the GGSN are not currently in use at the GGSN.

10. The apparatus of claim 9, wherein the logic when executed is further operable to:
maintain a mapping of NSAPIs that are assigned to each of the plurality of GGSNs; and
determine the NSAPI based on the mapping using the look-up table such that the determined NSAPI does not overlap with any other NSAPIs that are assigned to the determined GGSN.

11. The apparatus of claim 9, wherein the NSAPI is associated with a first tunnel between the first TTG and the determined GGSN.

12. The apparatus of claim 9, wherein the assigning the NSAPI comprises overwriting in the apparatus, an NSAPI that was previously assigned for the determined GGSN by a second TTG.

13. The apparatus of claim 9, wherein the assigning the NSAPI comprises generating the NSAPI for use by the determined GGSN.

14. The apparatus of claim 9, wherein the logic when executed is further operable to:
receive a second message from a second TTG;
determine a second NSAPI for the second message, wherein the second NSAPI does not overlap with the assigned NSAPI; and
assign the second NSAPI for use by the determined GGSN.

15. The apparatus of claim 14, wherein the logic when executed is further operable to send the second NSAPI to the determined GGSN, the determined GGSN establishing a connection with the second TTG, wherein session continuity is provided for the mobile device using the connection with the second TTG.

16. The apparatus of claim 9, wherein the logic when executed is further operable to send the NSAPI to the determined GGSN, the determined GGSN establishing a connection with the first TTG and associating the NSAPI with the connection.

17. An apparatus, comprising:
means for receiving, at the apparatus, a message associated with a mobile device from a first tunnel termination gateway of a plurality of tunnel termination gateways TTGs;
means for determining, at the apparatus, a gateway GPRS support node (GGSN) in a plurality of GGSNs to which to send the message from the apparatus, the first TTG and the determined GGSN providing a packet data gateway function in a wireless local area network, wherein the apparatus is a central point between the plurality of TTGs and the plurality of GGSNs in the packet data gateway function; and
means for assigning, at the apparatus, a network service access point identifier (NSAPI) for use by the determined GGSN, wherein the apparatus ensures that the assigned NSAPI is not currently in use at the determined GGSN by performing a table look-up in the apparatus;
means for receiving a plurality of messages from the plurality of tunnel termination gateways TTGs;
means for, for messages in the plurality of messages, determining different GGSNs in the plurality of GGSNs to which to send the messages; and
means for, for each of the different gateways, assigning, at the apparatus, NSAPIs for use by a GGSN that messages will be sent, wherein the apparatus ensures that the assigned NSAPIs for the GGSN are not currently in use at the GGSN.

18. The apparatus of claim 17, further comprising means for maintaining a mapping of NSAPIs that are assigned to each of the plurality of GGSNs, wherein assigning the NSAPI comprises:

means for determining the NSAPI based on the mapping using the look-up table such that the determined NSAPI does not overlap with any other NSAPIs that are assigned to the determined GGSN.

* * * * *